United States Patent
Lucidarme et al.

(10) Patent No.: US 7,103,310 B2
(45) Date of Patent: Sep. 5, 2006

(54) METHOD OF RESTRICTING THE USE OF A RADIO TERMINAL AND AN ASSOCIATED RESTRICTION DEVICE

(75) Inventors: Thierry Lucidarme, Montigny-le-Bretonneux (FR); Pierre Lescuyer, Montigny-le-Bretonneux (FR)

(73) Assignee: Nortel Networks Limited, Quebec (CA)

( * ) Notice: Subject to any disclaimer, the term of this patent is extended or adjusted under 35 U.S.C. 154(b) by 482 days.

(21) Appl. No.: 10/436,064

(22) Filed: May 13, 2003

(65) Prior Publication Data
US 2003/0224719 A1 Dec. 4, 2003

(30) Foreign Application Priority Data
May 30, 2002 (FR) .................................. 02 06645

(51) Int. Cl.
*H04K 3/00* (2006.01)
(52) U.S. Cl. ...................... 455/1; 455/435.1; 455/456.2
(58) Field of Classification Search ............. 455/456.4, 455/63.4, 1, 63.1, 431, 435.1, 435.2, 456.2, 455/456.1, 65
See application file for complete search history.

(56) References Cited

U.S. PATENT DOCUMENTS

| 6,393,254 B1 * | 5/2002 | Pousada Carballo et al. ... 455/1 |
| 6,687,506 B1 * | 2/2004 | Girod ...................... 455/456.4 |
| 2001/0006886 A1 | 7/2001 | Suzuki |

FOREIGN PATENT DOCUMENTS

GB  2 360 863  10/2001

\* cited by examiner

*Primary Examiner*—Matthew Anderson
*Assistant Examiner*—Tan Trinh
(74) *Attorney, Agent, or Firm*—Young & Thompson

(57) ABSTRACT

A request to access the network sent by a terminal is intercepted and a selective restriction criterion is evaluated on the basis of parameters relating to the intercepted access request. A radio signal is sent to jam an acknowledgment signal sent by the network in response to the access request if the selective restriction criterion is satisfied.

9 Claims, 2 Drawing Sheets

METHOD OF RESTRICTING THE USE OF A RADIO TERMINAL AND AN ASSOCIATED RESTRICTION DEVICE

The present invention relates to radio communication with mobile terminals, and more particularly to methods of jamming radio communication with mobile terminals.

BACKGROUND OF THE INVENTION

Jamming systems for civilian use have been developed to prevent mobile terminals sending and receiving calls in a particular geographical area. These systems can be used in places where the ringing of a mobile terminal and the subsequent conversation could be a nuisance to other people, for example in theaters and concert halls, places of worship, and reading rooms. It may also be desirable to prevent outgoing calls from a mobile terminal in a particular geographical area, for example a prison, an examination room, etc.

Some jamming systems prevent communication between a mobile terminal and its base station. They can operate by transmitting a signal at the carrier frequency of the signal to be jammed, in which case they are known as continuous wave jammers, or by jamming some information broadcast in a beacon signal of the base station. For example, in the Global System for Mobile communications (GSM), which uses a time-division multiple access (TDMA) technique, jamming time slots during which the network transmits control information to mobile terminals can prevent communication with mobile terminals in the coverage area of a jamming device.

Other jamming methods replace the exchange of signaling messages for setting up a call with the base station with which the mobile terminal would communicate during the normal call set-up process with signaling for refusing call set-up. This requires the jammer device to detect and service a random access request from a mobile terminal before the base station to which the request is actually addressed. This level of responsiveness relative to the network that is to be jammed can be difficult to achieve in situations in which the base station receives random access requests from mobile terminals just as well the jamming system or even better than the jamming system. This compromises the reliability of such systems, which are also complex since they have to substitute themselves for the network in terms of the network's communication with a terminal.

Furthermore, prior art jamming methods are not selective. Jamming devices jam all calls without distinguishing between them, and in particular they jam emergency calls, which cannot be sent or received in the coverage area of the devices. For example, a doctor cannot be contacted if he is in a theater or concert hall in which calls are jammed, and emergency calls cannot be sent from a theater or concert hall in which calls are jammed.

OBJECTS AND SUMMARY OF THE INVENTION

An object of the present invention is to alleviate the limitations of prior art jamming methods as explained above.

Thus the present invention proposes a method of restricting the use of a radio terminal able to communicate with a mobile radio network adapted to transmit an acknowledgment signal in response to receiving a network access request from the terminal, the method comprising the following steps:

intercepting a network access request sent by the terminal; evaluating a selective restriction criterion on the basis of parameters relating to the intercepted access request; and sending a radio signal to jam the acknowledgment signal if the selective restriction criterion is satisfied.

Evaluating the selective restriction criterion advantageously includes determining the type of call the terminal is seeking to set up on the basis of parameters relating to the intercepted access request. For example, the call type may correspond to emergency calls, so that the selective restriction criteria can be defined in such a manner as to avoid restricting emergency calls.

In a preferred embodiment of the invention, the parameters relating to the access request include parameters relating to resources used to request access.

An acknowledgment signal sent by a network can be restricted by transmitting a negative acknowledgment signal or a radio signal generating interference with the acknowledgment signal. This is known in the art.

When transmitting interference, the reliability of the method of the invention can be further improved by estimating a start time and an end time for reception of the acknowledgment signal by the terminal and starting to send a jamming signal before the estimated start time for reception of the acknowledgment signal by the terminal and continuing to send the signal beyond the estimated end time for reception of the acknowledgment signal by the terminal.

In another aspect, the invention provides a device for restricting the use of a radio terminal able to communicate with a mobile radio network adapted to transmit an acknowledgment signal in response to a request to access the network received from the terminal, the device comprising means for intercepting a request to access the network sent by the terminal, means for evaluating a selective restriction criterion on the basis of parameters relating to the intercepted access request, and means for sending a radio signal to jam the acknowledgment signal if the selective restriction criterion is satisfied.

The means for evaluating a selective restriction criterion advantageously comprise means for determining the type of call the terminal is seeking to set up on the basis of parameters relating to the intercepted access request.

In a preferred embodiment of the invention, the parameters relating to the access request comprise parameters relating to resources used to request access.

In a manner that is known in the art, the means for sending the radio signal for jamming the acknowledgment signal comprise means for sending a negative acknowledgment signal or means for sending a radio signal producing interference with said acknowledgment signal.

The device of the invention may further comprise means for receiving information relating to a network access procedure as broadcast by the network, said means co-operating with the interception and evaluation means.

BRIEF DESCRIPTION OF THE DRAWINGS

Other features and advantages of the present invention become apparent from the following description of a non-limiting implementation of a method of the invention, which is given with reference to the accompanying drawings, in which.

MORE DETAILED DESCRIPTION

Figure 1:
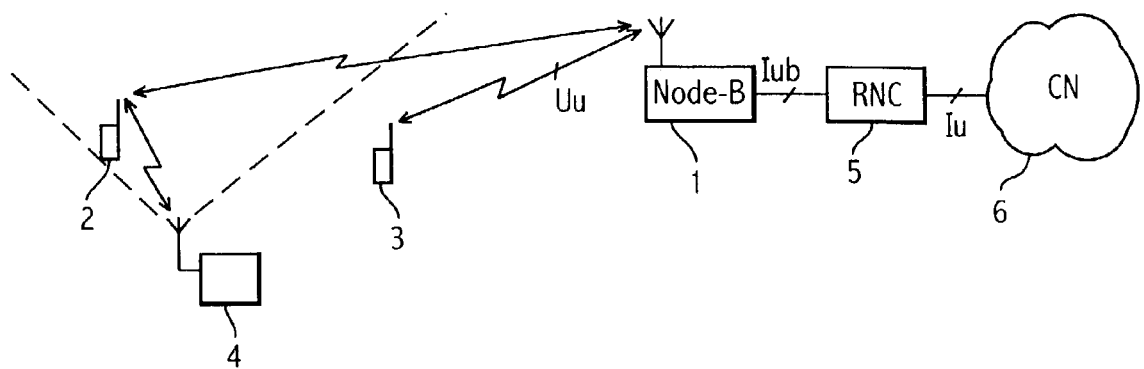
FIG. 1 shows two mobile terminals connected to a base station of a mobile radio communication system, one of which terminals is in the coverage area of a restriction device of the invention.

In the present description, the invention is more particularly described in a non-limiting application to third generation mobile radio networks in the form of the universal mobile telecommunication system (UMTS) when operating in the frequency division duplex (FDD) mode.

The UMTS is a mobile radio system whose access network, which is called the UMTS terrestrial radio access network (UTRAN), uses the code-division multiple access (CDMA) technique, which means that the symbols transmitted are multiplied by spreading codes consisting of samples referred to as "chips". The chip rate in the UMTS is 3.84 Mchip/s, which is higher than the rate at which symbols are transmitted. The UTRAN includes radio network controllers (RNC) 5 which control nodes of the network 1 via an interface Iub, which nodes are called "Node B" in the UMTS. Each Node B includes one or more base stations each servicing one or more cells. The base stations communicate by radio with mobile terminals 2, 3, which are called user equipment (UE) in the UMTS, via an interface Uu (see 3GPP Technical Specification 3G TS 25.401, version 3.3.0). The UTRAN is connected to a core network (CN) 6 via an Iu interface.

Each UE 2, 3 can be in any one of a plurality of states of connection with the UTRAN. These connection states are managed by a Radio Resource Control (RRC) protocol implemented at the RNC level and at the UE level (see 3GPP Technical Specification 3G TS 25.331, version 3.3.0, June 2000, section 9).

Unlike the UE 3, the UE 2 is in the coverage area of the restriction device 4, which is shown diagrammatically in dashed outline. The restriction device 4 can therefore intercept messages exchanged between the UE 2 and the Node B 1 and it can send signals that will be picked up by the UE 2.

Spreading codes distinguish between different physical channels (PhCH) that are superposed on the same transmission resource (carrier frequency). The autocorrelation and crosscorrelation properties of spreading codes enable a receiver to separate the PhCHs and extract symbols intended for it. For the UMTS downlink, when operating in the FDD mode, a code called a scrambling code is allocated to each base station and different physical channels used by the base station are distinguished by mutually orthogonal codes called channelization codes. For each PhCH, the overall spreading code is the product of the channelization code multiplied by the scrambling code of the base station. The spreading factor is equal to the ratio of the chip timing rate and the symbol timing rate and is a power of 2 from 4 to 512. It is chosen as a function of the bit rate of the symbols to be transmitted on the PhCH.

The various physical channels, including common channels and dedicated channels, conform to a frame structure in which 10 ms frames follow on in succession on the carrier frequency used by the base station. Each frame is divided into 15 time slots each of which has a duration of 666 µs.

To initialize a call, or more generally to transmit information to the UTRAN in an idle mode, the UE sends the selected base station a random access request signal on the physical random access channel (PRACH).

This random access procedure is executed by the physical layer (see 3GPP Technical Specifications 3G TS 25.211 and 3G TS 25.214, version 3.9.0, section 6), under the control of the medium access control (MAC) layer (see 3GPP Technical Specification 3G TS 25.321, version 3.9.0, September 2001, section 11.2) and of the RRC layer.

Figure 2:
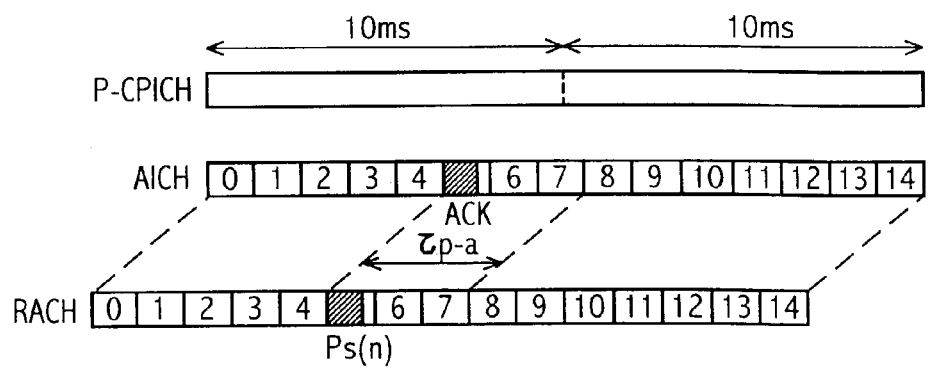
FIG. 2 is a diagram showing the frame structure employed for the RACH, AICH, and P-CPICH channels in the UMTS when operating in the frequency division duplex (FDD) mode.

FIG. 2 shows the structure of the PRACH. A mobile terminal performs a random access to the FDD mode UMTS access network by transmitting in a particular time slot called the access slot. Fifteen access slots spaced by 5120 chips are available in two 10 ms frames and constitute a pattern repeated every 20 ms.

There are twelve RACH sub-channels. An RACH sub-channel corresponds to a subset of the 15 access slots of the two frames. The EACH sub-channel numbered $\underline{i}$ ($i=0, \ldots 11$) is the $i^{th}$ uplink access slot that is $\tau_{p-a}$ chips ahead of the $i^{th}$ downlink access slot provided for the response from the access network and $(i+12.k)^{th}$ access slots calculated modulo 15, where $\underline{k}$ is an integer (see 3GPP Technical Specification 3G TS 25.214, version 3.9.0, December 2001, section 6.1).

A random access transmission consists of one or more preambles with a length of 4096 chips and a message 10 ms or 20 ms long. Each preamble has a length of 4096 chips and consists of 256 repetitions of a code $P_s(n)$, for $0 \leq n \leq 15$. The code is known as a signature and is one of 16 signatures available for submitting a random access request. The RACH preamble signatures $P_s(n)$ are Hadamard codes with a length of 16 chips, and are listed in section 4.3.3 of 3GPP Technical Specification TS 25.213, version 3.7.0, December 2001.

Each random access must be effected on a RACH sub-channel, which is one of twelve available sub-channels, using a particular signature from the 16 available signatures. These random access resources are used independently of each other, and can therefore be represented by a two-dimensional space, as in FIG. 3. This diagram shows all the pairs $(sc(i); P_s(n))$, for $0 \leq i \leq 11$ and $0 \leq n \leq 15$, where i is a RACH sub-channel number and n is a preamble signature number.

Access service classes (ASC) define a random access resources breakdown. There are K access service classes ASC(k), for $0 \leq k \leq K-1$, each corresponding to one or more subsets l(k) of pairs $\{(sc(i); P_s(n))/i_{min,l(k)} \leq i \leq i_{max,l(k)}$ and $n_{min,l(k)} \leq n \leq n_{max,l(k)}\}$. The same pair $(sc(i); P_s(n))$ can correspond to a plurality of ASC, and thus the resource breakdowns defined by the ASC can overlap. In this case, it is nevertheless assumed that there is at least one subset θ of pairs $\{(sc(i); P_s(n))/i_{min,\theta} \leq i \leq i_{max,\theta}$ and $n_{min,\theta} \leq n \leq n_{max,\theta}\}$, which subset may consist of only one pair, and to which there corresponds only one ASC, denoted ASC(θ).

Figure 3:
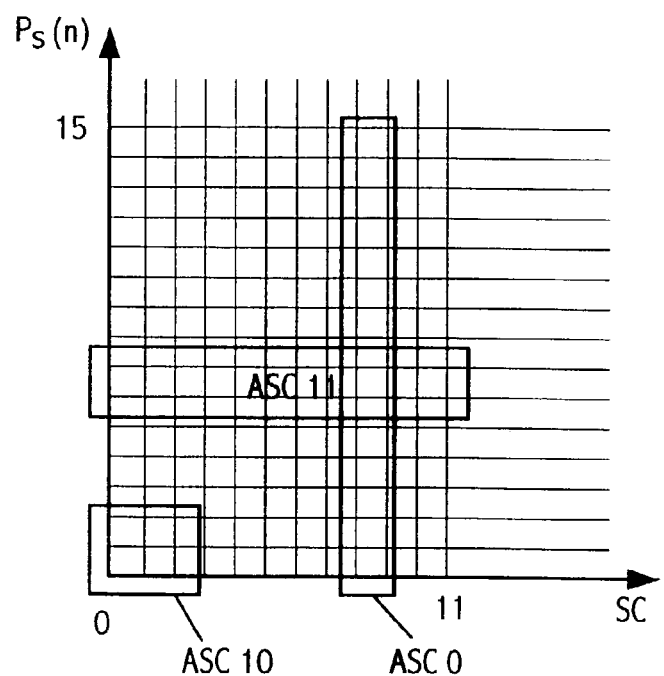
FIG. 3 is a diagram showing the definition of three ASCs in the random access resource space in the UMTS when operating in the FDD mode.

FIG. 3 shows a few examples of the correspondence between the set of random access resources $\{(sc(i); P_s(n))/ 0 \leq i \leq 11$ and $0 \leq n \leq 15\}$ and the ASC. A first ASC, numbered ASC(0), corresponds to the subset of resources $\{(sc(i); P_s(n))/8 \leq i \leq 9$ and $0 \leq n \leq 15\}$. The class ASC(11) corresponds to the subset $\{(sc(i); P_s(n))/0 \leq i \leq 11$ and $6 \leq n \leq 7\}$. The subset $\{(sc(i); P_s(n))/8 \leq i \leq 9$ and $6 \leq n \leq 7\}$ is then common to the two classes ASC(0) and ASC(11). The class ASC(θ) corresponds to the subset $\{(sc(i); P_s(n))/0 \leq i \leq 2$ and $0 \leq n \leq 2\}$, for example, as shown in FIG. 3.

A random access in the physical layer is initiated at the request of the MAC layer and can be effected only if the physical layer has received from the RRM layer a set of available signatures and the RACH sub-channels available for each ASC.

The UMTS includes access classes that can distinguish between different call types and are described in detail in 3GPP Technical Specification TS 22.011, version V3.7.0, section 4, pages 11 and 12. There are sixteen UMTS access classes numbered from 0 to 15.

The access classes which are numbered from 0 to 9 are called standard access classes and correspond to standard calls. They are allocated to all users to obtain a uniform random distribution. Each user is therefore allocated a standard access class, which is registered in his universal subscriber identity module (SIM/USIM), which can be a card that is inserted into the terminal.

In addition to this standard access class, some users have additional access classes from the five access classes numbered from 11 to 15. Access class 10 is reserved for emergency calls.

There is furthermore a correspondence, specific to each cell, between the ASC and the access classes (see 3GPP Technical Specification 3G TS 22.331, version V3.9.0, section 8.5.13). In the UMTS, a single ASC can be matched to the standard access classes and the other access classes can be matched individually to an ASC.

For the purposes of the invention, it is assumed below that the class ASC(θ) is matched only to a given access class, for example the access class 10 reserved for emergency calls.

If a UE is powered up and in a cell with no call in progress with the UTRAN, it is in an idle state. The initial cell selection and cell reselection processes are described in 3GPP Technical Specification 3G TS 25.304, version 3.6.0, March 2001, section 5.2. In the idle state, after selecting a cell, the UE receives system information sent on a broadcast channel (BCH) by the base station of the selected cell (see 3GPP Technical Specification 3G TS 25.331, version 3.9.0, December 2001, section 8.1.1).

The system information includes uplink access control information and information relating to the random access procedure in the physical layer.

The uplink access control information includes the access classes for which random access is authorized. The information relating to the random access procedure in the physical layer identifies the access slots and the signatures that it is permitted to use.

The system information further includes the correspondence between the access classes and the ASC for the cell.

The random access procedure in the physical layer provides for the UTRAN to send an acknowledgment (acquisition indicator (AI)) on the common downlink acquisition indicator channel (AICH) in respect of the RACH preamble signature. The acknowledgment has a structure similar to that of the PACH preamble in that it uses a spreading factor equal to 256 and a signature consisting of a sequence of 16 chips. The random access acknowledgment can be positive or negative. In this embodiment of the invention, an acknowledgment on the AICH using a signature identical to the RACH preamble signature is positive and an acknowledgment using a signature inverted relative to the RACH preamble signature is negative.

Like RACH sub-channels, the AICH is structured with a pattern consisting of 15 successive access time slots repeated every 20 ms (see FIG. 2). It is synchronized to a primary common pilot channel (P-CPICH) on which each base station of the Node B 1 sends a broadcast control signal (see 3GPP Technical Specification 3G TS 25.211, version 3.9.0, section 7). The P-CPICH provides a phase reference for other physical channels, including the AICH. It is distinguished by a single standardized channelization code. (see 3GPP Technical Specification 3G TS 25.213, version 3.9.0, section 5.2).

Downlink transmission of the acknowledgment can be initiated only at the beginning of the AICH access slot shifted by $\tau_{p-a}$ chips relative to the beginning of the access slot used for the uplink transmission of the random access preamble (where $\tau_{p-a}$ is a number determined as a function of the length of the message that follows the preamble).

Figure 4:
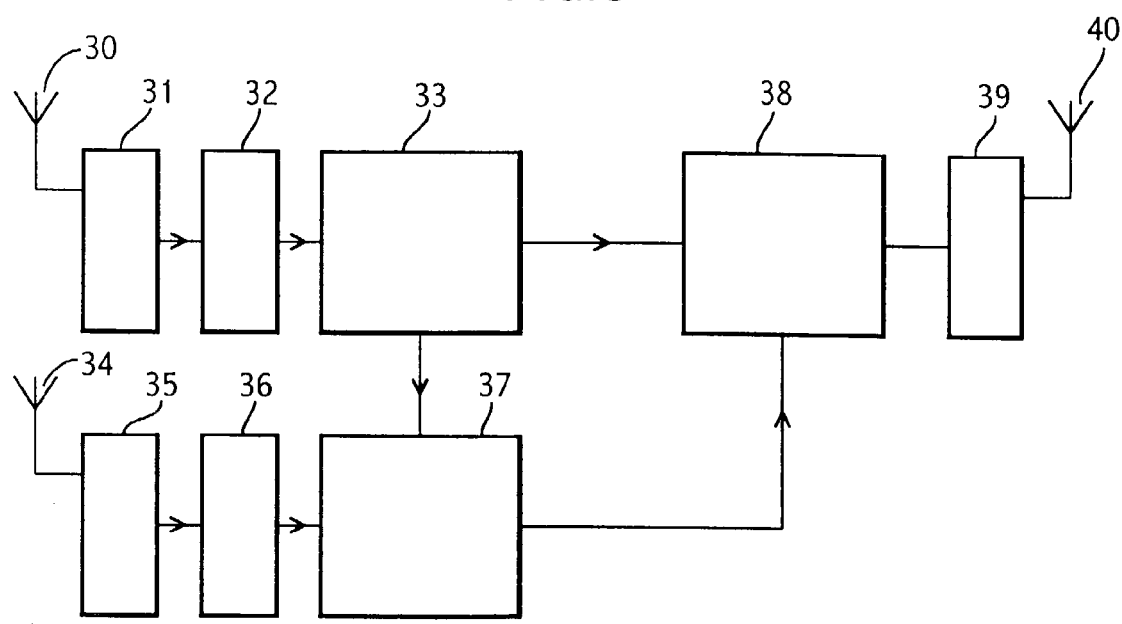
FIG. 4 is a block diagram of a restriction device of the invention.

FIG. 4 is a block diagram of a restriction device of the invention.

The restriction device has means 30, 31, 32 for receiving information broadcast by the access network to the user equipments UE and means 34, 35, 36 for receiving random access requests sent by the user equipments UE to the access network.

The receiving means 30, 31, 32 and 34, 35, 36 include a radio stage 31, 35 which receives radio signals picked up by the antenna 30, 34 and transposes them to a lower frequency. The signals are then passed to a receiver module 32, 36 for processing (reshaping filtering and analogue-to-digital conversion), in a manner that is known in the art.

The module 33 processes the system information decoded for each broadcast control channel detected by the receiver module 32 on the basis of the radio signals picked up by the antenna 30 and processed by the radio stage 31. This enables the acquisition of the following parameters of the common PRACH (see 3GPP Technical Specification 3G TS 25.331, version 3.9.0, sections 10.3.6.55 and 10.3.6.52):

the access slots for which sending a random access preamble is authorized;
the preamble signatures authorized for sending a random access preamble;
the random access preamble interleaving code; and
the authorized spreading factor values.

The access network also broadcasts the definition of the ASC (see 3GPP Technical Specification 3G TS 25.331, version 3.9.0, sections 10.3.6.55 and 10.3.6.53) and the timing parameters of the PRACH and the AICH (see 3GPP Technical Specification 3G TS 25.331, version 3.9.0, sections 10.3.6.55 and 10.3.6.2).

The C-PICH produces a phase reference for the AICH, and for the RACH sub-channels if the PRACH and AICH timing parameters have been acquired (see above).

On the basis of information broadcast by the access network, the restriction device can therefore detect and decode information transmitted in a RACH preamble of a UE that is effecting a random access in its coverage area.

Taking account of system information broadcast by the network also enables the device, like a UE, to determine and store the correspondence between access classes and ASC specific to each cell of the access network (see 3GPP Technical Specification 3G TS 25.331, version 3.9.0, sections 10.3.6.55 and 10.3.6.1). This processing is carried out in the module 33.

The module 33 also stores the correspondences both between the set of random access resources and the ASC, and also between the ASC and the access classes, for example in look-up tables that are updated on the basis of modifications to the information broadcast by the network.

When a UE initiates a random access, it selects an ASC as a function of the authorized access class that it uses for the call. During a standard call, the ASC selected in this way is the one that corresponds to the standard access classes (access classes 0 to 9).

To the class ASC(k) selected in this way there correspond (s) one or more authorized subsets l(k) of pairs {(sc(i); $P_s(n))/i_{min,l(k)} \leq i \leq i_{max,l(k)}$ and $n_{min,l(k)} \leq n \leq n_{max,l(k)}$} of the set of RACH resources (see above).

The module 37 processes the resource utilization information decoded for each physical random access channel detected by the receiver module 36 in the uplink direction (from the UE to the access network) on the basis of the radio signals picked up by the antenna 34 and processed by the radio stage 35.

Thus the jamming device intercepts random requests from UE in its coverage area on the basis of structural information of physical channels (PRACH) decoded by the module 33 and transmitted to the module 37.

The device of the invention applies selective restriction and the decision to jam a call or not is taken on the basis of parameters relating to the intercepted access request. In a preferred embodiment of the invention, the decision whether to jam is a function of the type of call, a characteristic that is embodied in the access class concept in the UMTS. The module 37 includes a configuration table which lists the access classes and an indicator for specifying if a call initialized by a random access request sent using a given access class must be jammed or not. The access class used for a call can be determined from the random access resources used, because of the correspondences established between the random access resources and the ASC, on the one hand, and the ASC and the access classes, on the other hand, and provided that at least some of the correspondences between the elements are one-to-one correspondences.

For each random access request, the module 37 determines the coordinates ($i_{RACH}$, $n_{RACH}$) of the pair of resources (sc($i_{RACH}$); $P_s(n_{RACH})$) used. It transmits the coordinates to the module 33, which can then send it in return one or access class identifiers. It then determines if at least of the access classes identified in this way must be restricted.

Thus the invention can inhibit restriction of emergency calls, for example. The configuration facility can set an indicator associated with the access class reserved for emergency calls to indicate that this particular class must not be restricted. In the event of an emergency call, the emergency access class is used and the class selected by the UE is ASC(θ). The corresponding random access can be effected only by using the resources of the subset θ of pairs each corresponding to one or more subsets l(k) of pairs {(sc(i); $P_s(n))/i_{min,\theta} \leq i \leq i_{max,\theta}$ and $n_{min,\theta} \leq n \leq n_{max,\theta}$}. The device of the invention intercepts the random access request and can recognize the use of the subset θ of pairs of resources, and consequently selection of the class ASC(θ) and use of the emergency call access class. Simply looking up the configuration table referred to above will lead to inhibition of restriction for an emergency call.

In the invention, jamming the acknowledgment of a random access request prevents any communication between a UE and its access network. The jamming as such is effected by means of techniques known in the art. For example, it can involve the restriction device sending a signal preventing the UE receiving an acknowledgment sent by the access network, or sending a negative acknowledgment.

In a preferred embodiment of the invention, the device includes a module 38 for commanding the sending of wideband signals to jam the acknowledgment of the random access request on the AICH. The module 38 receives from the module 33 information relating to sending on an AICH sub-channel and in particular information on synchronizing AICH sub-channels to the P-CPICH. The start time for sending the jamming signal is determined under the control of the module 37, which sends the module 38 the number $i_{RACH}$ of the random access sub-channel sc($i_{RACH}$) that is used. Sending the jamming signal is begun at the start of the corresponding time slot of the ($i_{RACH}$)$^{th}$ AICH sub-channel, and continues at least beyond the intended duration of an acknowledgment indicator AI, which has a length of 4096 chips. This is effected by the sender module 39 via the antenna 40.

It is further possible to take account of the transmission time of signals between a UE and a Node B. It can be advantageous to provide protection against the situation in which the UE whose calls are to be restricted is nearer its supervisory Node B than is the restriction device and to prevent the UE receiving the signal acknowledging its random access request before the jamming signal. For this purpose, the maximum propagation time between a UE and its base station is estimated in cells having coverage with a portion that overlaps the coverage area of the restriction device. The time for which the jamming signal is sent is then increased by an amount $T_{flight\_time}$ substantially greater than twice the maximum propagation time. The sending of the jamming signal then precedes the sending of the signal to be jammed by substantially half $T_{flight\_time}$.

In an urban environment, mobile radio system cells generally have a diameter of about 500 meters, which corresponds to 6.4 chip times in the UMTS when operating in the FDD mode. Advancing the sending of the jamming signal by 10 chips relative to the start time for sending the acknowledgment indicator and extending it commensurately relative to the end time for sending the indicator avoids the drawbacks caused by the difference in propagation times between the UE and its base station and between the UE and the restriction device.

In another embodiment of the invention, jamming consists in the restriction device sending a negative acknowledgment of the intercepted request. As previously indicated, in the UMTS a negative acknowledgment consists of a signature inverted relative to the RACH preamble signature. In this case, the module 38 holds in tables information necessary for constituting the negative acknowledgment. This information, which it receives from the module 33, comprises: authorized signatures, authorized access time slots, interleaving code, and P-CPICH synchronization information. On receiving parameters relating to an intercepted random access transmitted by the module 37, the module 38 commands the sending by the sender module 39 of a negative acknowledgment in the AICH access time slot corresponding to the PRACH sub-channel used for the random access request.

What is claimed is:

1. A method of restricting the use of a radio terminal able to communicate with a mobile radio network adapted to transmit an acknowledgment signal in response to receiving a network access request from the terminal, the method comprising the following steps:
   intercepting a network access request sent by the terminal;
   evaluating a selective restriction criterion on the basis of parameters relating to the intercepted access request; and
   sending a radio signal to jam the acknowledgment signal if the selective restriction criterion is satisfied,
   wherein the radio signal for jamming the acknowledgment signal is a radio signal adapted to produce interference with said acknowledgment signal, and
   wherein a start time for reception of the acknowledgment signal by the terminal and an end time for reception of said acknowledgment signal by the terminal are estimated and the sending of the jamming radio signal starts before the estimated start time for reception of the acknowledgment signal by the terminal and extends beyond the estimated end time for reception of said acknowledgment signal by the terminal.

2. A method according to claim 1, wherein evaluating the selective restriction criterion includes determining the type of call the terminal is seeking to set up on the basis of parameters relating to the intercepted access request.

3. A method according to claim 1, wherein the parameters relating to the access request include parameters relating to resources used to request access.

4. A method according to claim 3, wherein the network has access resources organized in accordance with a time division multiplex of access time slots and said parameters relating to the resources used to request access include a time slot number within said multiplex.

5. A method according to claim 3, wherein the parameters relating to the resources used to request access include an access code.

6. A device for restricting the use of a radio terminal able to communicate with a mobile radio network adapted to transmit an acknowledgment signal in response to a request to access the network received from the terminal, the device comprising means for intercepting a request to access the network sent by the terminal, means for evaluating a selective restriction criterion on the basis of parameters relating to the intercepted access request, and means for sending a radio signal to jam the acknowledgment signal if the selective restriction criterion is satisfied, wherein the radio signal for jamming the acknowledgment signal is a radio signal adapted to produce interference with said acknowledgment signal, and wherein a start time for reception of the acknowledgment signal by the terminal and an end time for reception of said acknowledgment signal by the terminal are estimated and, in the means for sending the radio signal to jam, the sending of the jamming radio signal starts before the estimated start time for reception of the acknowledgment signal by the terminal and extends beyond the estimated end time for reception of said acknowledgment signal by the terminal.

7. A device according to claim 6, wherein the means for evaluating a selective restriction criterion comprise means for determining the type of call the terminal is seeking to set up on the basis of parameters relating to the intercepted access request.

8. A system according to claim 6, wherein the parameters relating to the access request comprise parameters relating to resources used to request access.

9. A device according to claim 6, further including means for receiving information relating to a procedure for access to the network broadcast by the network cooperating with said interception and evaluation means.

* * * * *